US008555248B2

(12) United States Patent
Brunswig et al.

(10) Patent No.: US 8,555,248 B2
(45) Date of Patent: Oct. 8, 2013

(54) BUSINESS OBJECT CHANGE MANAGEMENT USING RELEASE STATUS CODES

(75) Inventors: Frank Brunswig, Heidelberg (DE); Dirk A. Giebel, Walldorf (DE); Hubert Klein, Bensheim (DE); Gerd Martin Ritter, Heidelberg (DE); Noam Tamarkin, Binyamina (IL)

(73) Assignee: SAP AG, Walldorf (DE)

( * ) Notice: Subject to any disclaimer, the term of this patent is extended or adjusted under 35 U.S.C. 154(b) by 584 days.

(21) Appl. No.: 12/639,698

(22) Filed: Dec. 16, 2009

(65) Prior Publication Data
US 2011/0145787 A1 Jun. 16, 2011

(51) Int. Cl.
*G06F 9/44* (2006.01)

(52) U.S. Cl.
USPC ............ 717/120; 717/121; 717/717; 717/122

(58) Field of Classification Search
USPC .................................................. 717/120–122
See application file for complete search history.

(56) References Cited

U.S. PATENT DOCUMENTS

2004/0181771 A1* 9/2004 Anonsen et al. ............... 717/100
2010/0299663 A1* 11/2010 Weissman et al. ............. 717/170

OTHER PUBLICATIONS

Gottschick, "Vision of the Clearing Process", Jun. 23, 2008, p. 1-77.*

* cited by examiner

*Primary Examiner* — Philip Wang
*Assistant Examiner* — Duy Khuong Nguyen
(74) *Attorney, Agent, or Firm* — Buckley, Maschoff & Talwalkar LLC

(57) ABSTRACT

A computer-implemented system may include a data store to store business data, an application platform, and a business application. The application platform may include a repository to store metadata defining a plurality of business objects, each of the business objects comprising a respective model of data and associated logic, each business object associated with respective business object entities, and a framework in communication with the repository to provide access to the business data. The business application is to access the data via the framework and based on the metadata, wherein the metadata associates a first plurality of the business object entities with a RELEASED release status code, and wherein the metadata associates a second plurality of the business object entities with a DEPRECATED release status code.

39 Claims, 6 Drawing Sheets

| Parent / Child | NOT RELEASED | RELEASED WITH RESTRICTIONS | RELEASED | DEPRECATED | DELETED |
|---|---|---|---|---|---|
| NOT RELEASED | X | X | X | X | - |
| RELEASED WITH RESTRICTIONS | - | X | X | - | - |
| RELEASED | - | - | X | - | - |
| DEPRECATED | - | - | X | X | - |
| DELETED | - | - | X | X | X |

FIG. 6

BUSINESS OBJECT CHANGE MANAGEMENT USING RELEASE STATUS CODES

FIELD

Some embodiments relate to enterprise services based on business objects and supported by an application platform. More specifically, some embodiments relate to systems to facilitate the development and maintenance of business applications based on an evolving application platform.

BACKGROUND

A business object is a software model representing real-world entities involved in business transactions. For example, a business object may represent a business document such as a sales order, a purchase order, or an invoice. A business object may also represent master data objects such as a product, a business partner, or a piece of equipment. Particular documents and master data objects (e.g., SalesOrder SO4711, ACME corporation) are represented by instances of their representing business object, or business object instances.

A business process platform, or application platform, exposes business objects for consumption by business applications. The business objects may model data and associated business logic in any suitable manner. Generally, the business objects may conform to a hierarchical structure consisting of sub-elements, or business object entities.

A business application may access data and logic of business object instances by referring to their associated business object entities. The business applications, in turn, provide data to end-users through user interfaces, reports, etc.

An application platform may evolve over time. For example, a provider of an application platform may add new business objects to the platform, modify existing business objects, and/or remove previously-provided business objects. Modifications may include the creation, change, or deletion of elements of the business objects, such as data elements, actions, or queries. Accordingly, it may be necessary to modify any business applications which consume thusly-modified or removed business objects.

Systems are desired to facilitate the adaptation of business applications based on current and/or planned changes to business objects consumed thereby.

BRIEF DESCRIPTION OF THE DRAWINGS

FIG. 6 illustrates a table describing release status code inheritance according to some embodiments.

DETAILED DESCRIPTION

Figure 1:
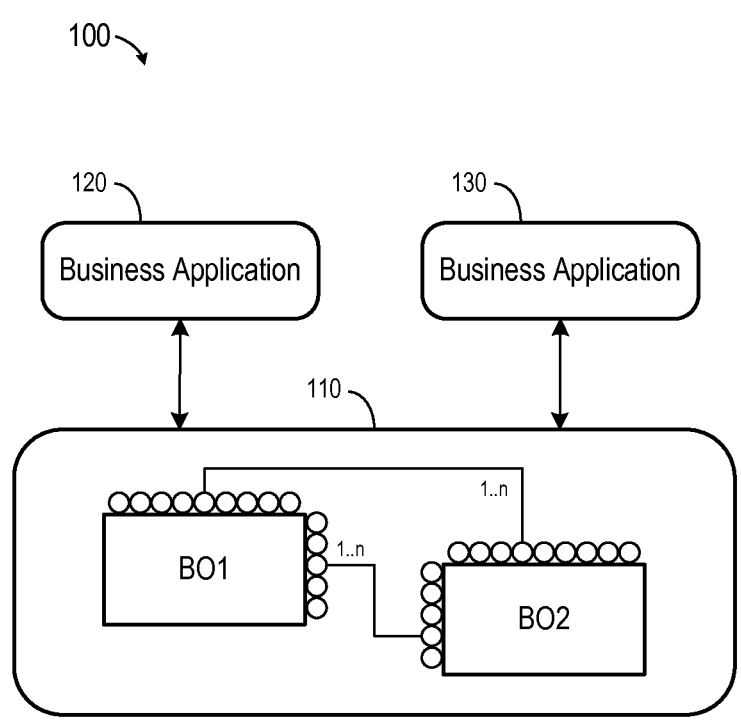
FIG. 1 is a block diagram of a system according to some embodiments.

FIG. 1 is a basic block diagram of system 100 according to some embodiments. System 100 includes application platform 110, including business object BO1 and business object BO2. Each business object exposes properties, some of which are related to another property via a specified cardinality (e.g., 1 . . . n). Business applications 115 and 120 are business applications developed based on application platform 110. For example, business application 115 may comprise a user interface layer to provide user interfaces to end users, and business application 120 may comprise a reporting layer for providing reports and analytics.

Business applications 115 and 120 may request and receive data from application platform 110 based on the structure of business objects BO1 and BO2. As described above, changes to business objects BO1 and/or BO2 (e.g., reflected in a new release of application platform 110) may require changes to one or both of business applications 115 and 120.

Figure 2:
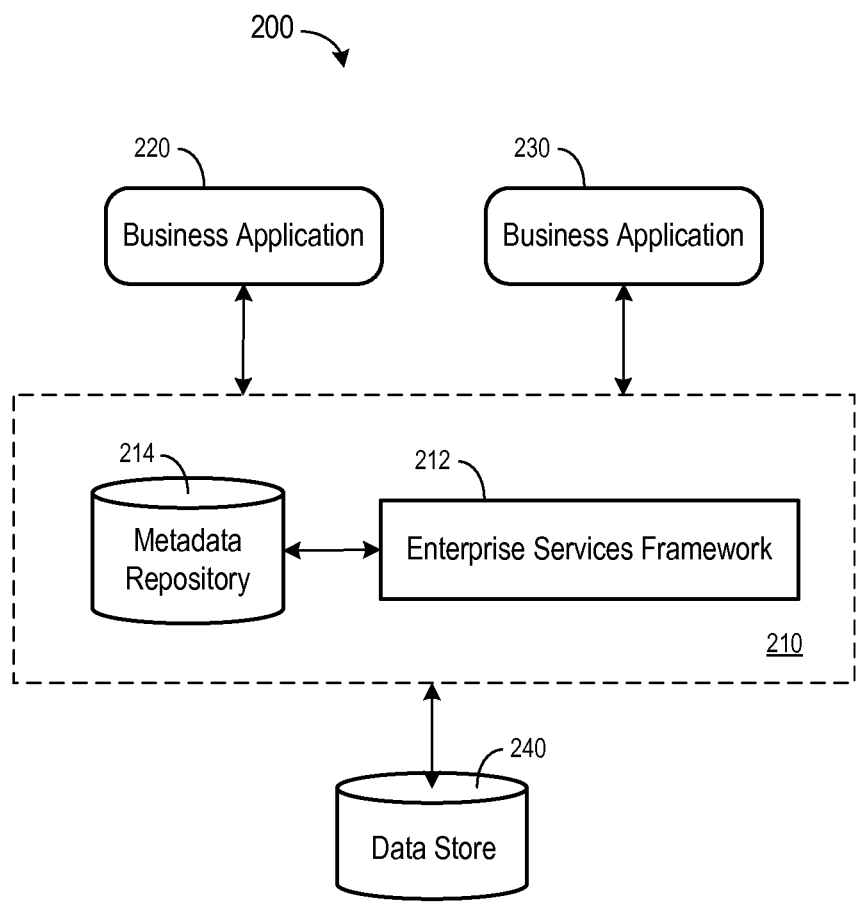
FIG. 2 is a block diagram of a system according to some embodiments.

FIG. 2 is a more detailed block diagram of system 200 according to some embodiments. System 200 includes application platform 210, business applications 220 and 230 and data store 240. FIG. 2 represents a logical architecture for describing some embodiments, and actual implementations may include more or different components arranged in any manner.

Data store 240 may comprise any one or more systems to store business data. Such systems include, but are not limited to, relational database systems, Online Analytical Processing (OLAP) database systems, data warehouses, application servers, and spreadsheets. Business applications 220 and 230 may leverage services provided by application platform 210 to access business data of data store 240.

Application platform 210 may comprise an SAP application platform based on SAP Netweaver®, but is not limited thereto. Application platform 210 includes enterprise services framework (ESF) 212 and metadata repository 214. Metadata repository 214 stores metadata associated with application platform 210 and defining business objects and business object entities associated with each business object. According to some embodiments, the metadata also associates some or all of the business object entities with a respective release status code. Types of release status codes and their usage will be described in detail below.

In operation, ESF 212 receives requests from business applications 220 and 230 which are associated with one or more business object instances. ESF 212 accesses metadata repository 214 to instantiate the business object instances and to populate the instances with associated business data of data store 240. ESF 212 may then manipulate the instances (if needed) and provide the requested services/data to business applications 220 and 230.

Figure 3:
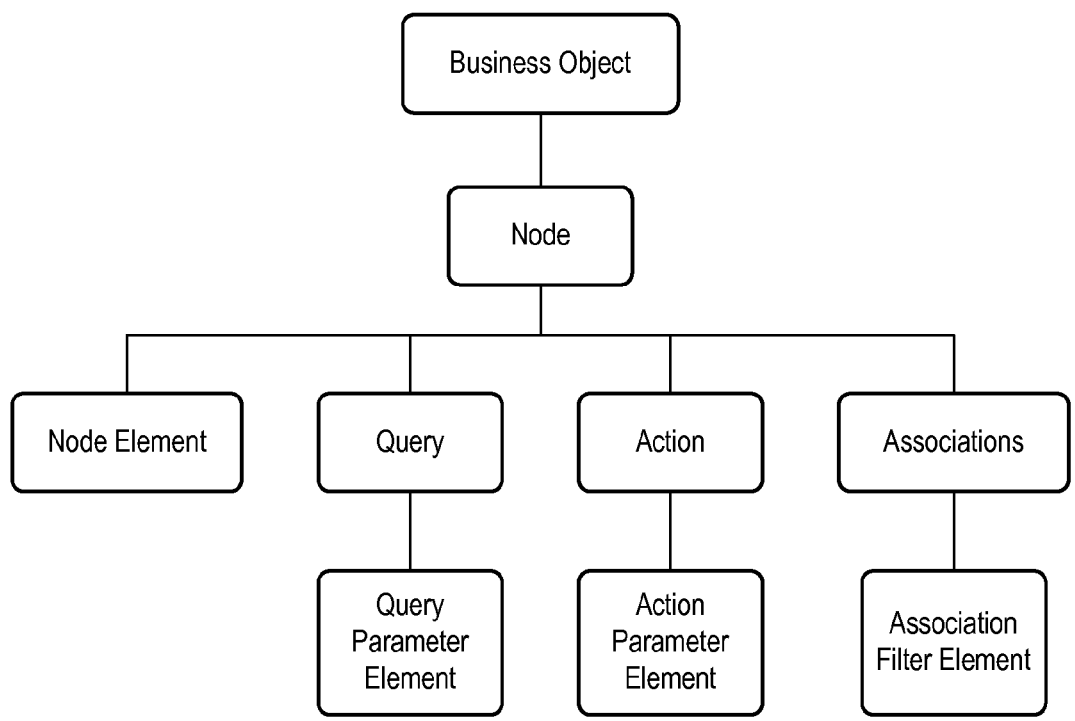
FIG. 3 illustrates elements of a business object according to some embodiments.

FIG. 3 illustrates elements of a business object according to some embodiments. Instances of the illustrated elements will be referred to herein as business object entities. For example, a given business object may include "search_by_address" and "search_by_product" as instances of the element "query". Each instance is considered a business object entity and therefore, as described below, may be associated with a respective business object release status code. A business application may use, require or otherwise rely on any one or more business object entities. Accordingly, changes to one or more business object entities may negatively impact the functionality of a business application relying thereon.

Figure 4:
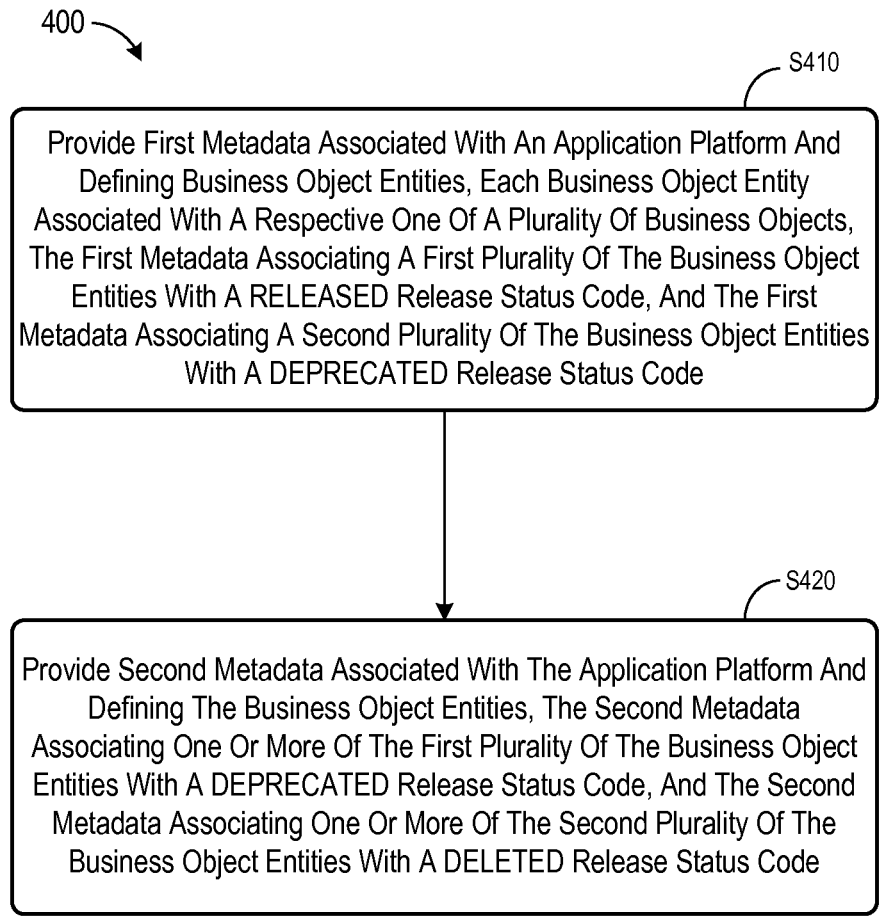
FIG. 4 is a flow diagram of process steps according to some embodiments.

FIG. 4 is a flow diagram of process 400 to provide release status codes associated with business object entities according to some embodiments. A release status code may provide an indication of an extent to which an associated business entity is and/or will be supported by the application platform. As will be evident from the foregoing description, the provision of release status codes may facilitate the development and/or maintenance of business applications which consume the application platform. According to some embodiments, future changes to a release status code associated with a business object entity may be governed by transition rules, which may result in additional certainty upon which business application development roadmaps may be based.

The foregoing is particularly useful in a case that the developer of the application platform and the developer of the business application belong to different organizations (e.g., companies). In such a case, coordination of development activities using intra-organizational measures is unavailable.

Process 400 may be executed by platform 210 and/or by a provider thereof, but embodiments are not limited thereto. In this regard, process 400 may be executed by any combination of hardware and/or software. Process 400 may be embodied in program code stored on a tangible medium and executable by a general-purpose computer processor to provide the functions described herein.

Initially, first metadata associated with an application platform is provided at S410. The first metadata defines business object entities such as, for example, the business object entities of structure 300. Each business object entity is associated with a respective one of a plurality of business objects. According to some embodiments, S410 comprises providing a software release of application platform 210, where the first metadata is part of metadata repository 214.

The first metadata provided at S410 associates a first plurality of the business object entities with a RELEASED release status code, and also associates a second plurality of the business object entities with a DEPRECATED release status code.

According to some embodiments, the RELEASED release status code indicates that each of the first plurality of the business object entities is supported in the current release of the application platform. The DEPRECATED release status code indicates that each of the second plurality of the business object entities is supported in the current release of the application platform and will not be supported in the next release of the application platform.

The first metadata may include other release status codes according to some embodiments. For example, the first metadata may associate a third plurality of the business object entities with a NOT RELEASED release status code. The NOT RELEASED release status code may indicate that the entity is modeled but not supported. Accordingly, such entities may only be visible to the application platform provides.

According to some embodiments, a particular release status code associated with a business object entity also indicates a set of one or more release status codes which may be associated with the business object entity in a next release of the application platform. These predefined release status code transitions provide additional guidance to developers of business applications consuming application platform 210.

For example, second metadata associated with the application platform is received at S420. The second metadata also defines the business object entities and may be part of a software release of the application platform that immediately succeeds the software release of S410. such as, for example, the business object entities of structure 300. The second metadata associates one or more of the first plurality of the business object entities with a DEPRECATED release status code, and also associates one or more of the second plurality of the business object entities with a DELETED release status code. According to some embodiments, the DELETED release status code indicates that an entity is no longer visible in application platform 210.

By noting the DEPRECATED release status code associated with the second plurality of the business object entities in the first metadata, a developer of a consuming business application may begin to plan for the unavailability of the second plurality of the business object entities in a next software release. Such changes cannot be directly shipped, since the developer of the business application needs time to react to the changes.

For example, the business application developer may invoke a "where used" function to identify components of the business application which utilize any of the second plurality of the business object entities. The business application developer may then change these components to account for the upcoming change or deletion of these business object entities. Similarly, an end user using adaptations of a DEPRECATED data element may have to migrate the adaptations to account for the upcoming change or deletion of the data element. These notifications can be automated by a workflow machine by evaluating the "where-used lists" and the corresponding release status code transitions automatically in a software release upgrade (or pre-upgrade), and by generating corresponding tasks for the business application developer.

As noted above, the application platform shipped with the first metadata supports the second plurality of the business object entities associated with the DEPRECATED release status code but, in some embodiments, the application platform may also support changes to one or more of the second plurality of the business object entities which will be reflected in the following release. If the application platform replaces one business object entity by another, then, at least for one release, the deprecated and the new business object entity, are both supported. Such support may further facilitate a business application developer's preparations for the following software release.

Process 400 describes an implementation in which release status codes associated with business object entities are allowed to transition from RELEASED to DEPRECATED and from DEPRECATED to DELETED. Such an implementation may conform to transition diagram 500 of FIG. 5. The arrows of transition diagram 500 indicate release status code transitions that are allowed to occur according to some embodiments. Transitions of current release status codes are not required in a next software release, however. Such predefined allowable release status code transitions may provide business application developers additional guidance in preparing for future software releases. The transitions therefore represent a kind of contract between the developer of the application platform and the developers of the business applications.

Figure 5:
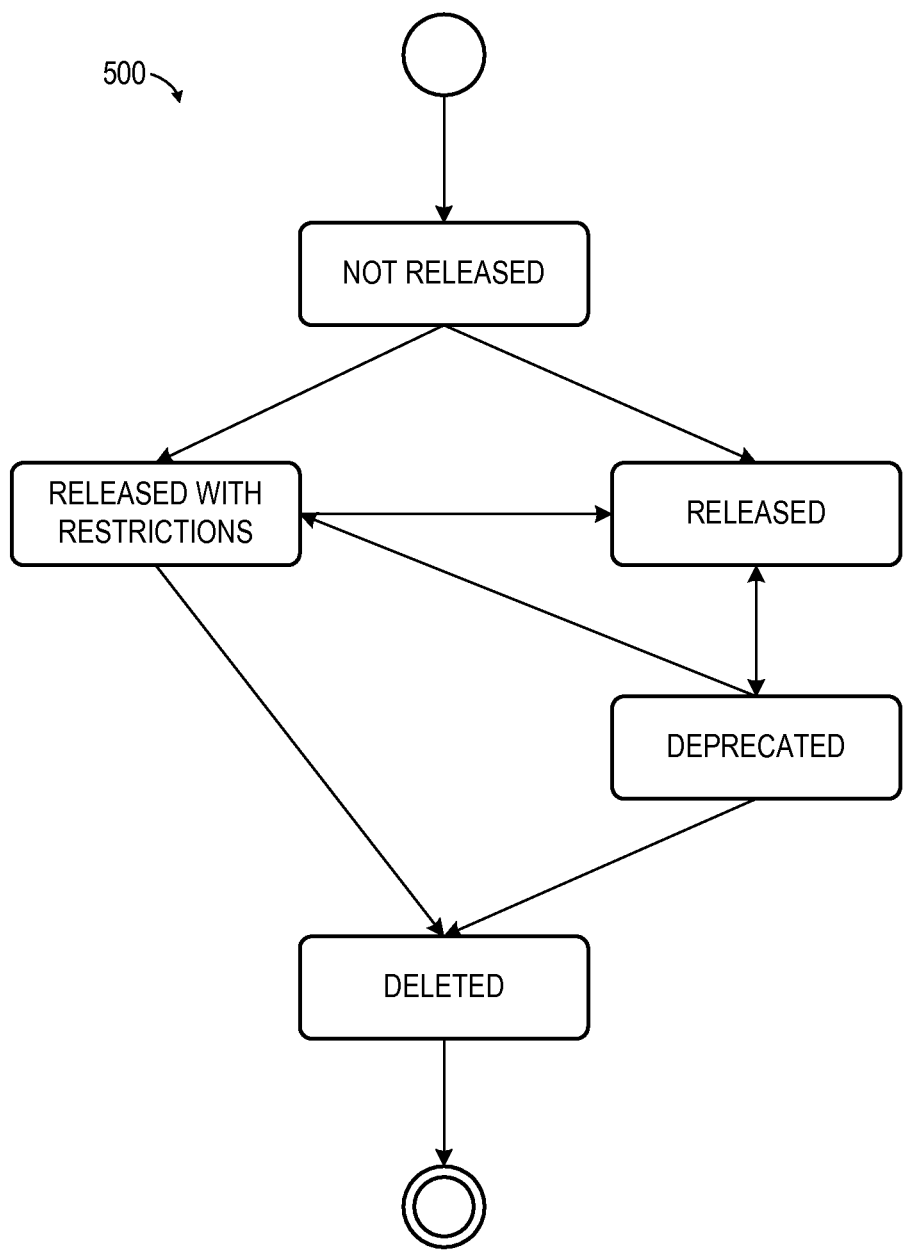
FIG. 5 is a state diagram illustrating allowed release status code transitions according to some embodiments.

As shown in FIG. 5, a business object entity associated with the NOT RELEASED release status code in a current software release may be associated with either the RELEASED WITH RESTRICTIONS or RELEASED release status codes in a next software release. The RELEASED WITH RESTRICTIONS release status code indicates that an associated business object entity is supported in the application platform, and that it may be used only by the application platform provider. As shown, the RELEASED WITH RESTRICTIONS status code may transition to either the RELEASED or DELETED release status codes.

The RELEASED release status code, on the other hand, may only transition to the DEPRECATED release status code. Accordingly, a business object entity remains associated with the RELEASED release status code throughout successive software releases until it is associated with the DEPRECATED release status code.

Process 400 describes a scenario in which the release status code associated with one or more of a second plurality of the business object entities transitions from DEPRECATED to DELETED. Diagram 500 shows that, in some embodiments, the DEPRECATED release status code may also transition to the RELEASED or RELEASED WITH RESTRICTIONS release status codes.

Further constraints may be established to codify the types of changes that the application platform may make to business object entities while continuing to associate the RELEASED release status code with those entities. Developers of consuming applications are therefore able to design the consuming applications to adapt to such changes without necessarily receiving any other advance warning thereof from the application platform provider.

In some examples of such constraints associated with the RELEASED release status code, the technical name of a business object entity cannot be changed, but a business object type category can be changed. In addition, some embodiments do not allow changing of the cardinality of a business object node action or of a business object node association while these business object entities are associated with the RELEASED release status code. In a case that one of these constraints is violated in a new release (e.g., the technical name of a query is changed even though the query was associated with the RELEASED release status code in the previous and the current release), some embodiments provide for computer-implemented handling of the violating change. For example, a corresponding flag may be raised in the business application development environment.

According to some embodiments, the release status codes which may be associated with a business object entity are dependent on the release status code associated with an associated parent business object entity. For example, and with respect to structure 300, a business object node action entity can be associated with the RELEASED release status code only if its parent business object node is associated with the RELEASED release status code.

FIG. 6 illustrates table 600 to define allowed combinations of parent/child release status codes according to some embodiments. For example, a child business object entity may be associated with the DEPRECATED release status code only if its parent business object entity is associated with the RELEASED or DEPRECATED release status codes. In another example, a child business object entity may be associated with any of the listed release status codes if its parent business object entity is associated with the RELEASED release status code. Embodiments are not limited to the release status codes or the constraints depicted in FIG. 6.

Each system and device described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a fixed disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
providing first metadata associated with a first release of an application platform and defining business object entities, each business object entity associated with a respective one of a plurality of business objects, the first metadata associating a first plurality of the business object entities with a RELEASED release status code, and the first metadata associating a second plurality of the business object entities with a DEPRECATED release status code; and
providing second metadata associated with a second release of the application platform and defining the business object entities, the second metadata associating one or more of the first plurality of the business object entities with a DEPRECATED release status code, and the second metadata associating one or more of the second plurality of the business object entities with a DELETED release status code that is different than the DEPRECATED release status code;
wherein the second release of the application platform is different from and later in time than the first release of the application platform;
the computer-implemented method further comprising:
determining that a cardinality of a business object node action has changed while the business object node action is associated with the RELEASED release status code or that a cardinality of a business object node association has changed while the business object node association is associated with the RELEASED release status code; and
in response to the determining that the cardinality of the business object node action has changed while the business object node action is associated with the RELEASED release status code or that the cardinality of the business object node association has changed while the business object node association is associated with the RELEASED release status code, raising a flag in a business application development environment to indicate that a constraint has been violated.

2. The computer-implemented method according to claim 1,
wherein the first metadata associates a third plurality of the business object entities with a NOT RELEASED release status code, and
wherein the second metadata associates the third plurality of the business object entities with a RELEASED release status code.

3. The computer-implemented method according to claim 1,
wherein the business object entities comprise one or more of the following: a business object node element, a business object node action, a business object node association, and a business object node query.

4. The computer-implemented method according to claim 1,
wherein the DEPRECATED release status code indicates that the first release of the application platform supports the associated business object entity and that the second release of the application platform will not support the associated business object entity.

5. The computer-implemented method according to claim 4,
wherein the DELETED release status code that is associated with the second plurality of the business object entities by the second metadata that is associated with the second release of the application platform indicates that each of the second plurality of the business object entities is not supported in the second release of the application platform.

6. The computer-implemented method according to claim 4, wherein the DELETED release status code that is associated with the second plurality of the business object entities by the second metadata that is associated with the second release of the application platform indicates that each of the second plurality of the business object entities is not visible in the second release of the application platform.

7. The computer-implemented method according to claim 1, wherein each release status code is associated with one or more predefined transitions to one or more other release status codes.

8. The computer-implemented method according to claim 7, wherein each release status code and its associated one or more predefined transitions are specified in a contract between a developer of the application platform and a developer of a consumer of the application platform.

9. The computer-implemented method according to claim 8, wherein the contract specifies types of changes allowed to business object entities associated with the RELEASED release status code.

10. The computer-implemented method according to claim 1, wherein the DEPRECATED release status code indicates that the first release of the application platform supports the associated business object entity and that the associated business object entity will be changed or deleted in the second release of the application platform.

11. The computer-implemented method according to claim 1, wherein the determining that a cardinality of a business object node action has changed while the business object node action is associated with the RELEASED release status code or that a cardinality of a business object node association has changed while the business object node association is associated with the RELEASED release status code comprises:
    determining that a cardinality of a business object node action has changed while the business object node action is associated with the RELEASED release status code; and
    wherein the raising a flag in a business application development environment to indicate that a constraint has been violated comprises:
        raising a flag in a business application development environment to indicate that a constraint has been violated in response to the determining that the cardinality of the business object node action has changed while the business object node action is associated with the RELEASED release status code.

12. The computer-implemented method according to claim 11, wherein the first metadata associated with the first release associates the business object node action with the RELEASED release status code;
    wherein metadata associated with a next release after the first release associates the business object node action with the RELEASED release status code;
    wherein the determining that a cardinality of a business object node action has changed while the business object node action is associated with the RELEASED release status code comprises:
        determining that the cardinality of the business object node action in the next release is changed from the cardinality of the business object node action in the first release; and
    wherein the raising a flag in a business application development environment to indicate that a constraint has been violated comprises:
        raising a flag in a business application development environment to indicate that a constraint has been violated in response to the determining that the cardinality of the business object node action in the next release is changed from the cardinality of the business object node action in the first release.

13. The computer-implemented method according to claim 1, wherein the determining that a cardinality of a business object node action has changed while the business object node action is associated with the RELEASED release status code or that a cardinality of a business object node association has changed while the business object node association is associated with the RELEASED release status code comprises:
    determining that a cardinality of a business object node association has changed while the business object node association is associated with the RELEASED release status code; and
    wherein the raising a flag in a business application development environment to indicate that a constraint has been violated comprises:
        raising a flag in a business application development environment to indicate that a constraint has been violated in response to the determining that the cardinality of the business object node association has changed while the business object node association is associated with the RELEASED release status code.

14. The computer-implemented method according to claim 13, wherein the first metadata associated with the first release associates the business object node association with the RELEASED release status code;
    wherein metadata associated with a next release after the first release associates the business object node association with the RELEASED release status code;
    wherein the determining that a cardinality of a business object node association has changed while the business object node association is associated with the RELEASED release status code comprises:
        determining that the cardinality of the business object node association in the next release is changed from the cardinality of the business object node association in the first release; and
    wherein the raising a flag in a business application development environment to indicate that a constraint has been violated comprises:
        raising a flag in a business application development environment to indicate that a constraint has been violated in response to the determining that the cardinality of the business object node association in the next release is changed from the cardinality of the business object node association in the first release.

15. The computer-implemented method according to claim 1, wherein the determining that a cardinality of a business object node action has changed while the business object node action is associated with the RELEASED release status code or that a cardinality of a business object node association has changed while the business object node association is associated with the RELEASED release status code comprises:

determining that a technical name of a query has changed while the query is associated with the RELEASED release status code; and wherein the raising a flag in a business application development environment to indicate that a constraint has been violated comprises:

raising a flag in a business application development environment to indicate that a constraint has been violated in response to the determining that a technical name of a query has changed while the query is associated with the RELEASED release status code.

16. The computer-implemented method according to claim 15, wherein the first metadata associated with the first release associates the query with the RELEASED release status code;

wherein metadata associated with a next release after the first release associates the query with the RELEASED release status code;

wherein the determining that a technical name of a query has changed while the query is associated with the RELEASED release status code comprises:

determining that the technical name of the query in the next release is changed from the technical name of the query in the first release; and wherein the raising a flag in a business application development environment to indicate that a constraint has been violated comprises:

raising a flag in a business application development environment to indicate that a constraint has been violated in response to the determining that the technical name of the query in the next release is changed from the technical name of the query in the first release.

17. A computer-implemented system comprising:
a system including hardware and comprising:
a data store to store business data;
an application platform comprising:
a repository to store first metadata associated with a first release of an application platform and defining a plurality of business objects, each of the business objects comprising a respective model of data and associated logic, each business object associated with respective business object entities; and
a framework in communication with the repository to provide access to the business data; and
a business application to access the data via the framework and based on the metadata,
wherein the metadata associates a first plurality of the business object entities with a RELEASED release status code,
wherein the metadata associates a second plurality of the business object entities with a DEPRECATED release status code; and
wherein the metadata associates a third plurality of the business object entities with a DELETED release status code that is different than the DEPRECATED release status code;
the application platform further to:
determine that a cardinality of a business object node action has changed while the business object node action is associated with the RELEASED release status code or that a cardinality of a business object node association has changed while the business object node association is associated with the RELEASED release status code; and
in response to the determination that the cardinality of the business object node action has changed while the business object node action is associated with the RELEASED release status code or that the cardinality of the business object node association has changed while the business object node association is associated with the RELEASED release status code, raise a flag in a business application development environment to indicate that a constraint has been violated.

18. The computer-implemented system according to claim 17,
wherein the metadata associates a fourth plurality of the business object entities with a NOT RELEASED release status code.

19. The computer-implemented system according to claim 17,
wherein business object entities comprise one or more of the following: a business object node element, a business object node action, a business object node association, and a business object node query.

20. The computer-implemented system according to claim 17, wherein the DEPRECATED release status code indicates that the application platform supports the associated business object entity in a current release of the application platform and will not support the associated business object entity in a next software release of the application platform.

21. The computer-implemented system according to claim 20,
wherein the DELETED release status code that is associated with the second plurality of the business object entities by the second metadata that is associated with the second release of the application platform indicates that each of the second plurality of the business object entities is not supported in the second release of the application platform.

22. The computer-implemented system according to claim 20,
wherein the DELETED release status code that is associated with the second plurality of the business object entities by the second metadata that is associated with the second release of the application platform indicates that each of the second plurality of the business object entities is not visible in the second release of the application platform.

23. The computer-implemented system according to claim 17,
wherein each release status code is associated with one or more predefined transitions to one or more other release status codes.

24. The computer-implemented system according to claim 23,
wherein each release status code and its associated one or more predefined transitions are specified in a contract between a developer of the application platform and a developer of the business application.

25. The computer-implemented system according to claim 24, wherein the contract specifies types of changes allowed to business object entities associated with the RELEASED release status code, and
wherein the business application is to detect changes to business object entities associated with the RELEASED release status code which are not among the specified types of changes.

26. The computer-implemented system according to claim 17,
wherein the DEPRECATED release status code indicates that the application platform supports the associated business object entity in a current release of the application platform and that the associated business object entity will be changed or deleted in a next software release of the application platform.

27. A non-transitory medium having an electronic data structure stored thereon, the electronic data structure comprising:
   metadata defining business object entities, each business object entity associated with a respective one of a plurality of business objects,
   wherein the metadata associates a first plurality of the business object entities with a RELEASED release status code,
   wherein the metadata associates a second plurality of the business object entities with a DEPRECATED release status code, and
   wherein the metadata associates a third plurality of the business object entities with a DELETED release status code that is different than the DEPRECATED release status code;
   the non-transitory medium further having computer-readable program code stored thereon, the computer-readable program code executable by a computer processor to result in a method comprising:
      determining that a cardinality of a business object node action has changed while the business object node action is associated with the RELEASED release status code or that a cardinality of a business object node association has changed while the business object node association is associated with the RELEASED release status code; and
      in response to the determining that the cardinality of the business object node action has changed while the business object node action is associated with the RELEASED release status code or that the cardinality of the business object node association has changed while the business object node association is associated with the RELEASED release status code, raising a flag in a business application development environment to indicate that a constraint has been violated.

28. The medium according to claim 27,
   wherein the metadata associates a fourth plurality of the business object entities with a NOT RELEASED release status code.

29. The medium according to claim 28,
   wherein business object entities comprise one or more of the following: a business object node element, a business object node action, a business object node association, and a business object node query.

30. The medium according to claim 27, wherein the DEPRECATED release status code indicates that the application platform supports the associated business object entity in a current release of the application platform and will not support the associated business object entity in a next software release of the application platform.

31. The medium according to claim 30,
   wherein the DELETED release status code that is associated with the second plurality of the business object entities by the second metadata that is associated with the second release of the application platform indicates that each of the second plurality of the business object entities is not supported in the second release of the application platform.

32. The medium according to claim 30,
   wherein the DELETED release status code that is associated with the second plurality of the business object entities by the second metadata that is associated with the second release of the application platform indicates that each of the second plurality of the business object entities is not visible in the second release of the application platform.

33. The medium according to claim 27,
   wherein each release status code is associated with one or more predefined transitions to one or more other release status codes.

34. The medium according to claim 33,
   wherein each release status code and its associated one or more predefined transitions are specified in a contract between a developer of the application platform and a developer of a consumer of the application platform.

35. The medium according to claim 34, wherein the contract specifies types of changes allowed to business object entities associated with the RELEASED release status code.

36. The medium according to claim 27,
   wherein the DEPRECATED release status code indicates that the application platform supports the associated business object entity in a current release of the application platform and that the associated business object entity will be changed or deleted in a next software release of the application platform.

37. A computer-implemented method comprising:
   providing first metadata associated with an application platform and defining business object entities, each business object entity associated with a respective one of a plurality of business objects, the first metadata associating a first plurality of the business object entities with a RELEASED release status code, and the first metadata associating a second plurality of the business object entities with a DEPRECATED release status code; and
   providing second metadata associated with the application platform and defining the business object entities, the second metadata associating one or more of the first plurality of the business object entities with a DEPRECATED release status code, and the second metadata associating one or more of the second plurality of the business object entities with a DELETED release status code;
   wherein the DEPRECATED release status code indicates that the application platform supports the associated business object entity in a current release of the application platform and will not support the associated business object entity in a next software release of the application platform;
   the computer-implemented method further comprising:
      determining that a cardinality of a business object node action has changed while the business object node action is associated with the RELEASED release status code or that a cardinality of a business object node association has changed while the business object node association is associated with the RELEASED release status code; and
      in response to the determining that the cardinality of the business object node action has changed while the business object node action is associated with the RELEASED release status code or that the cardinality of the business object node association has changed while the business object node association is associated with the RELEASED release status code, raising a flag in a business application development environment to indicate that a constraint has been violated.

38. A computer-implemented system comprising:
   a system including hardware and comprising:
      a data store to store business data;

an application platform comprising:
- a repository to store metadata defining a plurality of business objects, each of the business objects comprising a respective model of data and associated logic, each business object associated with respective business object entities; and
- a framework in communication with the repository to provide access to the business data; and a business application to access the data via the framework and based on the metadata;

wherein the metadata associates a first plurality of the business object entities with a RELEASED release status code;

wherein the metadata associates a second plurality of the business object entities with a DEPRECATED release status code; and wherein the DEPRECATED release status code indicates that the application platform supports the associated business object entity in a current release of the application platform and will not support the associated business object entity in a next software release of the application platform;

the application platform further to:
- determine that a cardinality of a business object node action has changed while the business object node action is associated with the RELEASED release status code or that a cardinality of a business object node association has changed while the business object node association is associated with the RELEASED release status code; and
- in response to the determination that the cardinality of the business object node action has changed while the business object node action is associated with the RELEASED release status code or that the cardinality of the business object node association has changed while the business object node association is associated with the RELEASED release status code, raise a flag in a business application development environment to indicate that a constraint has been violated.

39. A non-transitory medium having an electronic data structure stored thereon, the electronic data structure comprising:
- metadata defining business object entities, each business object entity associated with a respective one of a plurality of business objects;
- wherein the metadata associates a first plurality of the business object entities with a RELEASED release status code;
- wherein the metadata associates a second plurality of the business object entities with a DEPRECATED release status code; and
- wherein the DEPRECATED release status code indicates that the application platform supports the associated business object entity in a current release of the application platform and will not support the associated business object entity in a next software release of the application platform;

the non-transitory medium further having computer-readable program code stored thereon, the computer-readable program code executable by a computer processor to result in a method comprising:
- determining that a cardinality of a business object node action has changed while the business object node action is associated with the RELEASED release status code or that a cardinality of a business object node association has changed while the business object node association is associated with the RELEASED release status code; and
- in response to the determining that the cardinality of the business object node action has changed while the business object node action is associated with the RELEASED release status code or that the cardinality of the business object node association has changed while the business object node association is associated with the RELEASED release status code, raising a flag in a business application development environment to indicate that a constraint has been violated.

* * * * *